United States Patent [19]

Schwertner et al.

[11] 3,868,130

[45] Feb. 25, 1975

[54] ADJUSTABLE REUSABLE TUBING END FITTING

[75] Inventors: Gary T. Schwertner; Russell W. Zajaczkowski, both of Cleveland, Ohio

[73] Assignee: The Weatherhead Company, Cleveland, Ohio

[22] Filed: Aug. 16, 1971

[21] Appl. No.: 172,036

[52] U.S. Cl. .......... 285/243, 285/323

[51] Int. Cl. .......... F16l 33/00

[58] Field of Search .......... 285/243, 248, 249, 322, 285/323, 382, 242, 245, 246, 247, 250

[56] References Cited

UNITED STATES PATENTS

| | | | |
|---|---|---|---|
| 3,191,975 | 6/1965 | LaMarre et al. | 285/243 |
| 3,222,091 | 12/1965 | Marshall | 285/243 X |

FOREIGN PATENTS OR APPLICATIONS

| | | | |
|---|---|---|---|
| 913,160 | 12/1962 | Great Britain | 285/243 |
| 328,787 | 5/1930 | Great Britain | 285/243 |

*Primary Examiner*—Dave W. Arola

*Attorney, Agent, or Firm*—McNenny, Farrington, Pearne & Gordon

[57] ABSTRACT

A fitting for releasably securing a hose or tube onto a tubular insert positioned therein comprising a collar and ring positionable on the exterior of the hose and each including mutually cooperating camming surfaces adapted to radially constrict the collar and thereby lock the hose on the insert when the ring is pushed over the collar and adapted to release the hose when the ring is pulled from the collar.

9 Claims, 3 Drawing Figures

PATENTED FEB 25 1975 3,868,130

INVENTORS
GARY T. SCHWERTNER,
& RUSSELL W. ZAJACZKOWSKI
BY
McNENNY, FARRINGTON, PEARNE & GORDON

ATTORNEYS

ADJUSTABLE REUSABLE TUBING END FITTING

BACKGROUND OF THE INVENTION

The present invention relates to end fittings for flexible hose or tubing and more particularly, it relates to a novel reusable fitting assembly for such hose.

The fitting of the present invention is particularly adapted for use with non-rigid tubing such as rubber or plastic tubing, e.g., polyvinyl chloride, polyethylene, or nylon tubing. The fitting is especially suited for hydraulic or pneumatic systems operating at relatively low to moderate pressure or vacuum. Examples of such systems are instrumentation, test apparatus, and controls. The invention provides significant advantages in situations where circuits are frequently changed or disconnected such as in developmental work involving experimental circuits. It is to be understood that, according to common usage, the term tubing applies to an unreinforced flexible product and the term hose applies to reinforced tubing. A fitting constructed in accordance with the invention is compatible with either of these products and, therefore, the terms are used interchangeably herein.

PRIOR ART

A common type of hose fitting for low pressure applications is the fitting type which includes a member with an elongated tubular portion adapted to be axially inserted into a hose end and which includes on its outer surface one or more annular saw tooth ribs or barbs. The barbs of the fitting are intended to internally grip the hose and prevent it from pulling off of the fitting. This type of fitting is somewhat limited in the types of tubing with which it may be employed. The tubing must be relatively elastic to insure a reliable connection. In addition, it is often necessary, in order to disassemble the fitting from the hose, to cut the hose and thereby destroy a portion. Further, this fitting type is usable only under relatively low pressure conditions.

Also previously used with plastic or other flexible hose is the compression type of fitting. The fitting, ordinarily, comprises a fitting body, a compression ring, and a nut threadable onto the fitting body to radially compress the ring around the tube. This second type of fitting is, generally, relatively expensive to produce. Further, hose may not be assembled with the fitting via a simple axial motion but, rather, the nut must be wrenched or otherwise turned onto the fitting body until the three piece assembly is drawn tight.

SUMMARY OF THE INVENTION

The invention provides a novel hose end fitting for releasably securing a hose to a tubular insert. The fitting comprises a ring and collar which are slipped over a hose end and which cooperate to radially constrict the hose onto the tubular insert. The ring and collar each include camming surfaces which, through mutual engagement when the ring is pushed over the collar, cause the collar to tighten and constrict radially on the hose. The ring is quickly and easily positioned on the collar by axial movement of the ring relative to the collar. This movement may be effected manually without requiring the use of tools. Similarly, the ring may be quickly removed from the collar by simply reversing the axial force applied. Removal of the ring from the collar releases the grip of the collar on the hose and the interference between the hose and insert so that the hose and insert may be separated.

The fitting itself is reusable and the gripped portion of the hose is not permanently deformed or otherwise altered by the use of the fitting. In its preferred form, the fitting is adjustable to accommodate normal dimensional variations in hose or tubing and insert as well as the type of flexible material and to allow a desired tightness of fit to be selected. In this preferred form, the fitting is simple in construction and may be economically produced, for instance, by molding.

DESCRIPTION OF THE PREFERRED EMBODIMENT

Figure 1:
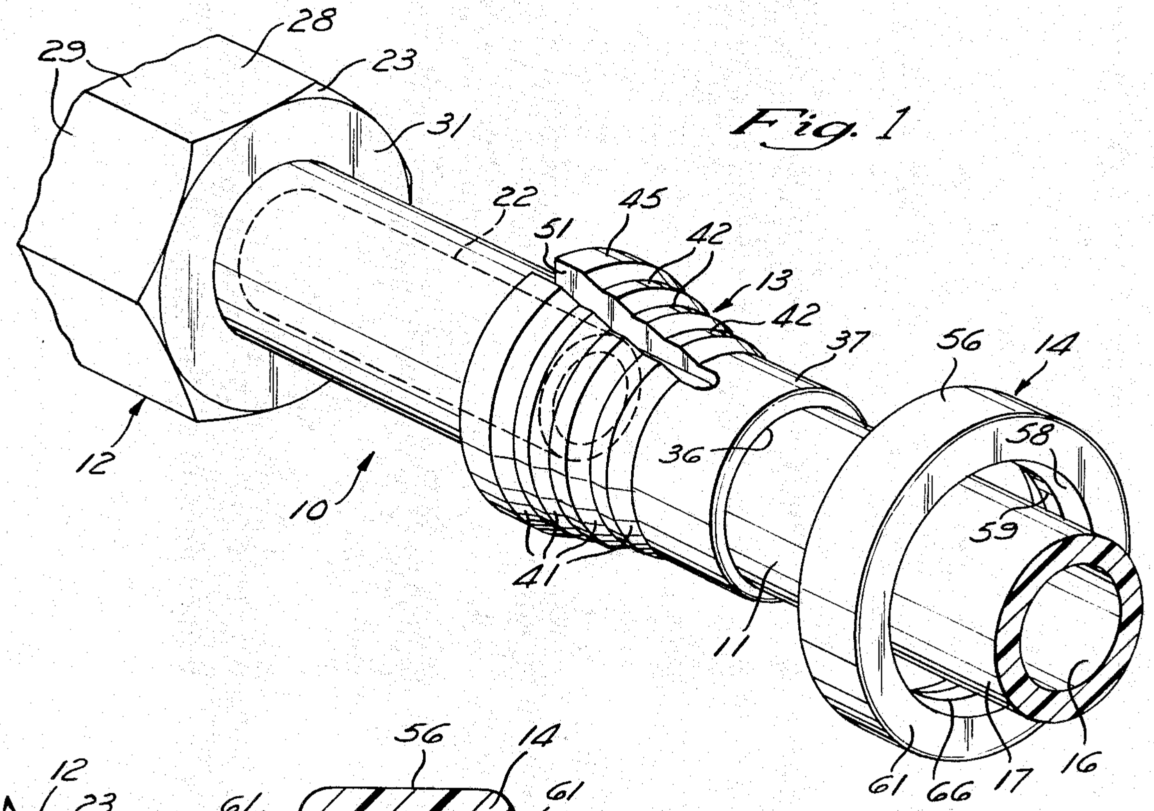
FIG. 1 is an axially exploded perspective view of a hose end fitting assembly constructed in accordance with the present invention.

Referring now to the Figures, there is shown a hose fitting assembly 10 embodying the present invention and including a hose 11, a tubular insert 12, a collar 13, and a ring 14. The hose 11 may be formed, for instance, as an extrusion of non-rigid or flexible plastic or elastomeric material such as rubber, polyethylene, polypropylene, nylon, polyvinyl chloride or the like. The hose or tube 11 is circular in cross section and has substantially uniform inside and outside diameters 16 and 17, respectively, along its entire length. The axis of the hose fitting 10 is shown at 15 in FIG. 2.

The tubular insert 12 includes an elongated nipple portion 22 extending from an enlarged head portion 23. An axial bore or passage 24 runs through both the head and nipple portions of the insert 12. An outside surface 26 of the nipple portion 22, preferably, has a diameter substantially equal to the nominal inside diameter of the hose 11. As illustrated, the exterior surface 26 of the nipple portion 22 is cylindrical. Where it is necessary or desirable, the exterior surface 26 of the nipple may be formed with one or more circumferential ribs to improve sealing characteristics of the fitting assembly 10.

The head portion 23 of the insert 12 may be internally threaded with a straight or tapered pipe thread, for instance, to form a female connector adapted to be threaded onto a threaded male element of a fluid circuit. An outer periphery 28 of the head portion 23 is formed with wrench flats 29 defining a hexagonal cross section. At the base or outer end of the nipple portion 22 of the insert, the head portion 23 provides a surface or shoulder 31, ideally, extending in a radial plane. The tubular insert 12 may be formed of any suitable material, for instance, metal or plastic and may be formed by machining, molding, or the like.

The collar 13 is a cone shaped member having an axial aperture or bore 36, preferably, cylindrical through its length. The diameter of the cylindrical bore 36 is substantially equal to the nominal outside diameter 17 of the hose 11. At a rearward or inner end, the collar 13 forms a circumferentially continuous, short cylindrical section 37 having a relatively thin wall of generally uniform thickness. In a forward direction from the cylindrical section 37, the collar increases in its outside diameter, ideally, in a series of steps. Each step comprises a tapered or conical surface 41 and a land surface 42. Each conical surface 41 is tapered such that its diameter generally increases in size in reference to a direction towards a forward or outer end 45 of the collar 13.

Preferably, the land surfaces 42 are cylindrical so that their diameters do not substantially increase in size in the forward direction. For reasons which will be made apparent below, it may be desirable to provide the land surfaces 42 with a slight taper reversed from the taper direction of the conical surfaces 41. From the above description and from the figures it may be appreciated that the mean or average diameter of each successive conical surface 41 increases in the forward direction towards the outer end 45 of the collar.

At the extreme inner end, the cylindrical section 37 of the collar 13 is beveled at 47 to facilitate positioning of the ring 14 on the exterior of the collar 13. At the opposite or outer end 45, the collar terminates in an end face 48, generally, lying in a radial plane. One or more slots 51 extend longitudinally from the end face 48 to the inner cylindrical section 37 and radially from the central aperture or bore 36 outwardly to the exterior surfaces 41 and 42 of the collar 13. The nipple portion 22 of the insert 12 is sufficiently long to internally support the hose 11 in an axial zone encircled by the collar 13. The collar 13 is formed of resiliently deformable plastic or elastomeric material such as rubber, polyethylene, polypropylene, nylon, polyvinyl chloride or the like and may be produced by molding or otherwise forming such material into the desired shape.

Figure 2:
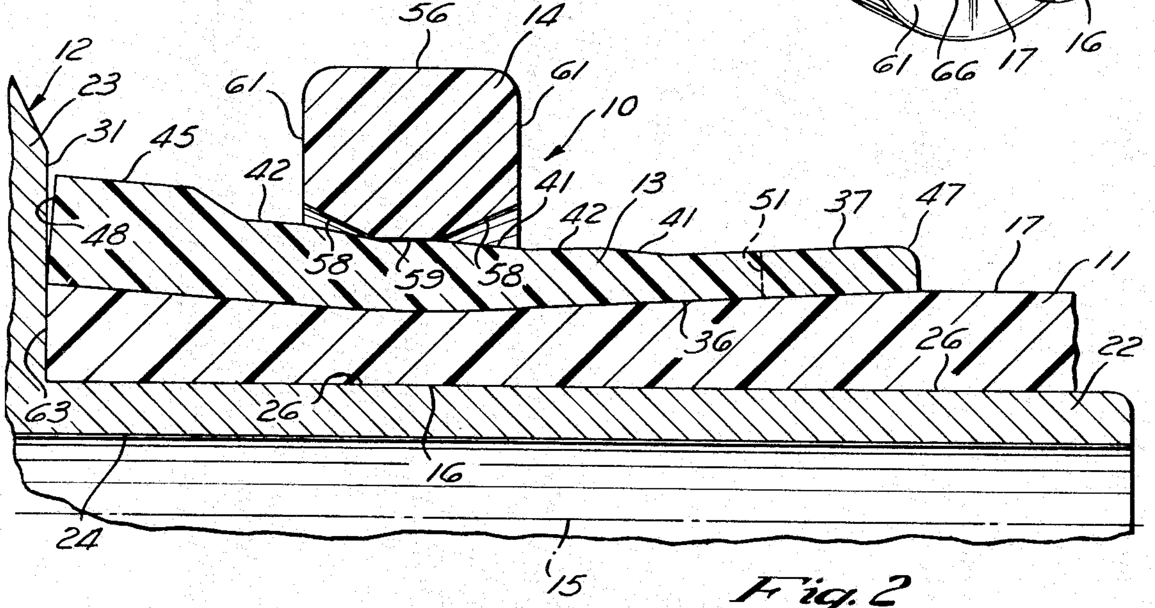
FIG. 2 is a longitudinal, cross-sectional view of an upper portion of the fitting assembly in an installed condition.

The ring or sleeve 14 is adapted to be pushed onto the exterior of the collar 13. The ring 14 is circular in shape and includes a generally cylindrical outer surface 56 defining the major diameter of the ring. A central passage through the ring 14 is defined by a pair of opposed conical surfaces 58 and a cylindrical bore 59 therebetween. On each side of the ring 14 there is provided a generally radial end face 61. As best illustrated in FIG. 2, the ring 14 is symmetrical about a radial plane midway between the radial end faces 61 and may thus be assembled with either of its end faces 61 facing the head portion 23 of the insert 12. The cylindrical bore 59 of the ring 14, ideally, is slightly larger than the outside of the cylindrical section 37 of the collar 13 to permit the ring to initially be slipped easily onto the collar. The ring may be economically formed by molding or machining it to shape and may be made of any of the materials indicated above for the collar 13 in proportions which will substantially prevent an increase in diameter when assembled on the collar.

To assemble the hose fitting 10 the ring 14 is first slipped over the end of the hose 11 and next the collar 13 is slipped over the end of the hose with the cylindrical section 37 facing the ring 14. The hose 11 and insert 12 are joined by pushing the hose 11 over the nipple portion 22 of the insert until an end face 63 of the hose abuts or bottoms on the radial shoulder 31 of the head portion 23 of the insert. The collar 13 is slipped forward until its end face 48 abuts the radial shoulder 31 of the insert head 23. Finally, the ring 14 is pushed with an axial force towards the forward end 45 of the collar.

The leading internal conical surface 58 and the cylindrical bore 59 of the ring 14 engage each conical surface 41 to cam the collar radially inward as the ring 14 moves axially relative to the collar 13. Constriction of the collar 13 causes the hose 11 to be radially compressed and locked onto the insert 12. The ring 14 is pushed axially forward until a particular land surface 42 is reached to give a desired tightness or locking of the hose 11 on the insert 12. Generally, the tightness of the grip of the collar 13 on the hose 11 is proportional to the diameter of a selected land surface 42. The final land surface 42 chosen will depend on, among other factors, the actual relative sizes of the insert 12 and hose 11, the hardness or stiffness of the hose, the expected pressure in the hose, and the permanency of the connection of the hose with the insert. The longitudinal slot or slots 51 permit the collar 13 to be radially constricted with a minimum amount of compression of the collar material and thereby minimizes the axial force on the ring 14 necessary to constrict the hose 11.

Figure 3:
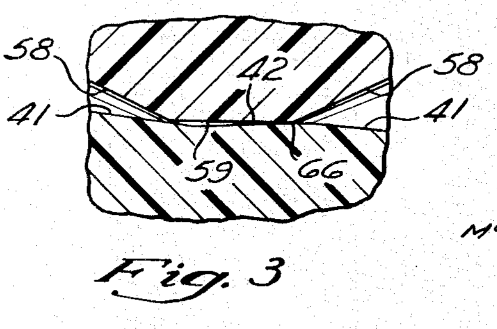
FIG. 3 is a fragmentary, cross-sectional view, on an enlarged scale, of the contact area between the ring and collar of the fitting assembly.

FIG. 3 more clearly illustrates the manner in which the ring 14 engages the collar 13 when finally positioned thereon. Radial compression of the collar 13 by the ring 14 causes deformation of the particular land surface 42 on which the ring rests. Ideally, a land surface 42 is distorted slightly into a reverse taper opposite from that of the conical surfaces 41 so that an edge 66 of the ring 14, formed by its bore 59 and the trailing or inner conical surface 58, locks on the land surface 42 and thereby retains the ring on the collar against normal service loading. To insure that the ring 14 is retained in this manner, it may be desired to initially form the land surfaces 42 with a slight reverse taper. In any event, it may be seen that the land surfaces 42, by not having a taper or inclination in the same direction as the conical surfaces 41, do not allow tensile forces in the ring 14 to move the ring rearward towards the inner end 37 of the collar and thereby accidentally release the hose 11.

From the above description it should be understood that the fitting members 12–14 may be installed on the hose 11 manually, without the use of tools, if desired. The actual gripping or locking of the hose 11 on the insert 12 is quickly accomplished by manually pushing the ring 14 onto the collar 13, by engaging the rearward end face 61, without the need for extraneous motions such as twisting or turning the ring 14. This procedure may be simply reversed by manually pulling the ring 14 off the collar 13, by engaging the forward end face 61, to quickly release the hose 11 from the insert 12. Because the operation of the coupling of this invention requires no permanent deformation of either the hose or the coupling members, it is recognized that both the hose and the coupling members may be disassembled and reused and individual parts may be replaced as desired without affecting the operation of the other coupling members as required by the circumstances.

Although a preferred embodiment of this invention is illustrated it is to be understood that various modifications and rearrangements of parts may be resorted to without departing from the scope of the invention disclosed and claimed herein.

What is claimed is:

1. A fitting assembly for a flexible hose comprising a tubular insert having an elongated portion of generally circular cross section, a flexible hose having substantially uniform inside and outside diameters at one of its ends, the outer surface of said insert portion defining a diameter substantially equal to the inside diameter of the end of said hose, said insert portion being positioned within the end of said hose to internally support it, a resiliently deformable tubular collar defining a first clamping member, said collar having an inner diameter substantially equal to the outer diameter of the hose and outer peripheral surface means, said collar being positioned over the end of said hose with at least a portion of the collar forming said surface means within an axial zone of said hose supported by said insert portion, a ring element defining a second clamping member, said ring element having an aperture therethrough at least large enough to permit said hose to extend therethrough, said ring element having internal surface means adapted to cooperate with said collar surface means, the surface means of one of said clamping members including axially separate zones, a first of said zones being axially tapered outwardly in a forward direction towards said hose end, a second of said zones adjacent said first zone having less outward taper in said forward direction than said first zone, said first zone causing said collar to radially constrict when said ring element is pushed axially forward onto said collar to thereby grip said hose and lockingly compress the hose onto said insert portion, said ring being releasably retained on said collar by frictional engagement of said second zone with the surface means of the other of said clamping members, said surface means of said members permitting removal of said ring element from said collar and release of said hose from said insert when said ring element is pulled rearwardly off of said collar.

2. A fitting assembly as set forth in claim 1 wherein said collar member is longitudinally split in the axial direction of said hose in a zone defined by its surface means.

3. A fitting assembly as set forth in claim 1 wherein said surface means of one of said clamping members includes at least one conical generally circular surface increasing in diameter towards the end of said hose and at least one generally circular surface not substantially increasing in diameter towards said hose end.

4. A fitting for clamping a flexible hose onto an insert positioned in the hose comprising a resiliently deformable tubular collar having a cylindrical interior defining a normal inside diameter of the collar, a stepped diameter exterior including a plurality of circular conical surfaces each increasing in diameter along a common axial direction and alternating with intervening surfaces not substantially increasing in diameter in said axial direction, each successive conical surface and each intervening surface having a mean diameter larger than the preceding conical surface and intervening surface respectively, and a longitudinal slot extending axially substantially through a major portion of the length of the collar and radially substantially from the interior to the exterior of the collar, a circularly continuous ring adapted to be positioned over the exterior of the collar, said ring having a circular through bore sized to permit the ring to be positioned on the exterior of the collar to engage one of said intervening surfaces with an interference fit and thereby cause the inside diameter of the collar to decrease from said normal diameter, said ring including opposed generally radial end faces providing manual gripping surfaces engageable for pushing the ring on and pulling the ring from said collar.

5. A fitting as set forth in claim 4 wherein said ring is symmetrical about a plane transverse to its axis and said bore includes at each end a conical surface thereby permitting said ring to be guided on said collar with either of its end faces facing towards said collar.

6. A hose end fitting for a flexible hose comprising a tubular insert having an elongated portion of a generally circular cross section, a flexible hose having substantially uniform inside and outside diameters adjacent an end, the outer surface of said insert portion defining a diameter substantially equal to the inside diameter of the end of said hose, said insert portion being positioned within the end of said hose to internally support it, a resiliently deformable tubular collar having a normal inside diameter substantially equal to the outside diameter of the hose end, said collar having a stepped diameter exterior including a plurality of conical surfaces each increasing in diameter along a common axial direction and alternating with intervening surfaces not substantially increasing in diameter in said axial direction, each successive conical surface and each successive intervening surface having a mean diameter larger than the preceding conical surface or intervening surface respectively, and a longitudinal slot extending axially through a major portion of the length of the collar and radially from the interior to the exterior of the collar, said collar being positioned over the end of said hose with at least a portion of the collar forming said stepped diameter exterior, within an axial zone of said hose supported by said insert portion, a circularly continuous ring positioned on the exterior of the collar, said ring having a circular bore sized to produce an interference fit with one of said intervening surfaces and cause the inside diameter of the collar to decrease from said normal inside diameter and to thereby cause said hose to constrict radially onto said insert portion and be locked thereto, said ring including opposed generally radial end faces providing manual gripping surfaces engageable for pushing the ring on and pulling the ring from said collar, removal of said ring from said collar causing release of said hose from said insert.

7. A hose end fitting as set forth in claim 6 wherein said intervening surfaces are normally substantially cylindrical, and said bore of said ring includes a substantially cylindrical portion.

8. A hose end fitting as set forth in claim 7 wherein said longitudinal slot extends rearwardly from an end of said collar adjacent the end of said hose and terminates at a point short of the other end of said collar, said collar including a circularly continuous portion at said other end.

9. A fitting assembly for a flexible hose comprising a tubular insert having an elongated portion of generally circular cross section, a flexible hose having substantially uniform inside and outside diameters at one of its ends, the outer surface of said insert portion defining a diameter substantially equal to the inside diameter of the end of said hose, said insert portion being positioned within the end of said hose to internally support it, a resiliently deformable tubular collar defining a first clamping member, said collar having an inner diameter substantially equal to the outer diameter of the hose, said collar having an outer peripheral surface means, said collar being positioned over the end of said hose with at least a portion of the collar forming said surface means within an axial zone of said hose supported by said insert portion, a ring element defining a second clamping member, said ring element having an aperture therethrough at least large enough to permit said hose to extend therethrough, said ring element having internal surface means co-operating with said collar surface means to cause said collar to radially constrict when said ring element is pushed axially forward onto said collar to thereby grip said hose and lockingly compress the hose onto said insert portion, the surface means of one of said clamping members comprising a series of tapered surfaces individually tapered radially outward in a direction towards said hose end and increasing in size with respect to each other in said direction, said tapered surfaces alternating with intervening surfaces individually not substantially increasing in size in said direction and with respect to each other increasing in size in said direction, said ring being releasably retained on said collar by cooperation of said surface means, said surface means permitting removal of said ring element from said collar and release of said hose from said insert when said ring element is pulled rearwardly off of said collar.

* * * * *

UNITED STATES PATENT OFFICE
CERTIFICATE OF CORRECTION

PATENT NO. : 3,868,130
DATED : February 25, 1975
INVENTOR(S) : Schwertner & Zajaczkowski It is certified that error appears in the above-identified patent and that said Letters Patent are hereby corrected as shown below:

Under the caption "What is claimed is:", Column 6, Claim 8, Line 44, change "7" to -- 6 --.

Signed and sealed this 17th day of June 1975.

(SEAL)
Attest:

RUTH C. MASON
Attesting Officer

C. MARSHALL DANN
Commissioner of Patents
and Trademarks